(12) United States Patent
Schibsbye

(10) Patent No.: US 9,333,712 B2
(45) Date of Patent: May 10, 2016

(54) METHOD OF PRODUCING A FIBRE REINFORCED STRUCTURE

(75) Inventor: Karsten Schibsbye, Boulder, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 331 days.

(21) Appl. No.: 13/440,324

(22) Filed: Apr. 5, 2012

(65) Prior Publication Data

US 2012/0261864 A1    Oct. 18, 2012

(30) Foreign Application Priority Data

Apr. 14, 2011    (EP) .................................. EP11162408

(51) Int. Cl.
*B29C 65/78*    (2006.01)
*B29C 70/44*    (2006.01)
*B29C 70/38*    (2006.01)

(52) U.S. Cl.
CPC ................ *B29C 70/443* (2013.01); *B29C 70/38* (2013.01)

(58) Field of Classification Search
None
See application file for complete search history.

(56) References Cited

U.S. PATENT DOCUMENTS

| 4,242,160 A | 12/1980 | Pinter | |
| 4,401,495 A * | 8/1983 | McKinney | ..................... 156/173 |
| 4,946,538 A | 8/1990 | Bendarzewski | |
| 5,575,881 A * | 11/1996 | Keester et al. | ................. 156/175 |
| 5,981,023 A | 11/1999 | Tozuka et al. | |
| 2007/0251641 A1 | 11/2007 | Cuenca Rincon | |
| 2009/0114337 A1 * | 5/2009 | Llorente Gonzalez et al. | ............................. 156/185 |
| 2010/0007065 A1 | 1/2010 | Juergens | |
| 2011/0049770 A1 * | 3/2011 | Stiesdal | ........................ 264/511 |

FOREIGN PATENT DOCUMENTS

| CN | 1554531 A | 12/2004 |
| CN | 1721161 A | 1/2006 |
| CN | 101641196 A | 2/2010 |
| EP | 2133373 A1 | 12/2009 |
| EP | 2283995 A1 | 2/2011 |
| JP | 2003082117 A | 3/2003 |
| JP | 2006212383 A | 8/2005 |
| JP | 2005246771 A | 9/2005 |
| JP | 2009001681 A | 1/2009 |
| JP | 2011038520 A | 2/2011 |
| JP | 2013525140 A | 6/2013 |
| WO | WO 2007099825 A1 | 9/2007 |
| WO | WO 2011128110 A1 | 10/2011 |

* cited by examiner

*Primary Examiner* — Monica Huson

(57) ABSTRACT

A method in which a fiber material is laid on a mold surface resembling a negative image of a fiber reinforced structure to be produced. Layering the fiber material on the mold surface includes laying rovings of the fiber material on the mold surface or on a fiber material already laid on the mold surface and applying an low pressure to a space between the rovings and the mold surface.

18 Claims, 2 Drawing Sheets

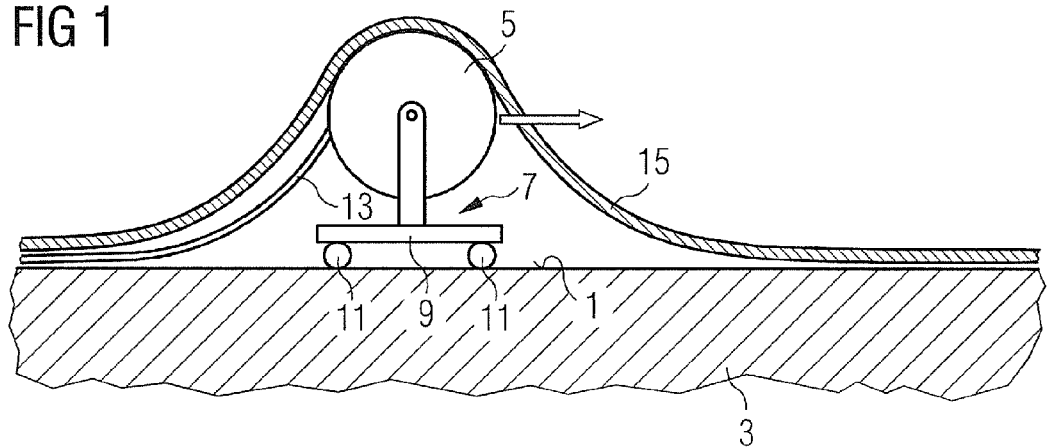
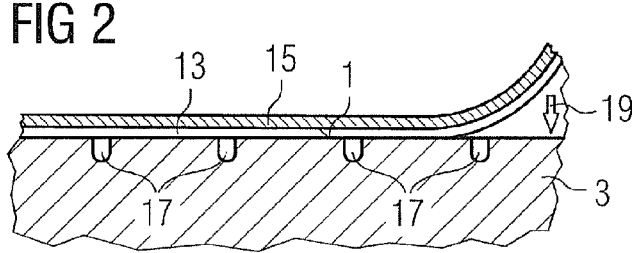
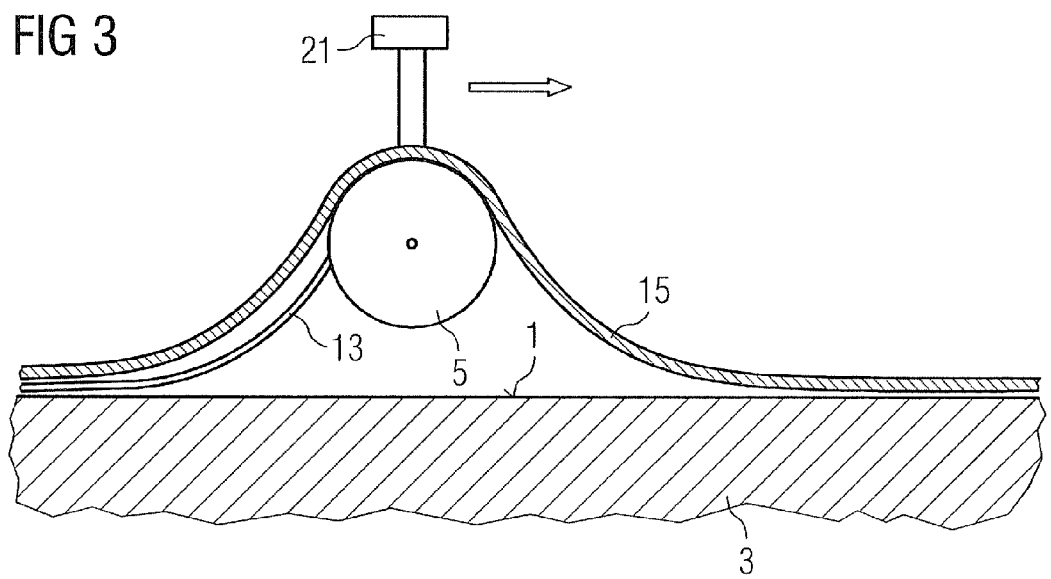

METHOD OF PRODUCING A FIBRE REINFORCED STRUCTURE

CROSS REFERENCE TO RELATED APPLICATIONS

This application claims priority of European Patent Office application No. 11162408.6 EP filed Apr. 14, 2011. All of the applications are incorporated by reference herein in their entirety.

FIELD OF INVENTION

The present invention relates to a method in which a fibre material is laid on a mould surface resembling a negative image of a fibre reinforced structure to be produced. In particular, the invention relates to a method laying fibre material on a wind turbine rotor blade mould.

BACKGROUND OF INVENTION

A method for manufacturing a fibre reinforced structure, namely a wind turbine rotor blade, is for example disclosed in EP 2 133 373 A. Typically, fibre layers in form of mats are stacked on each other in a mould and, after the mould is closed, a resin is infused and cured so as to produce the rotor blade.

Another method of producing a fibre reinforced structure is known from U.S. Pat. No. 4,242,160, which describes a method of producing a wind turbine rotor blade, comprises the use of a filament reinforced composite mandrel. The filaments are wound on the mandrel to ultimately form a spar of the wind turbine rotor blade.

SUMMARY OF INVENTION

In the light of the known state of the art it is an objective of the present invention to provide an advantageous method of producing fibre reinforced structures like wind turbine rotor blades.

Described is a method of laying a fibre material on a mould surface resembling a negative image of a fibre reinforced structure to be produced. After the fibre material is laid on the mould surface, a resin is infused and cured so as to harden the structure in order to produce the fibre-reinforced structure. Laying the fibre material on the mould surface comprises the step of laying rovings of a fibre material on the mould surface or on a fibre material, which may be in the form of rovings, mats etc., that is already laid on the mould surface. An low pressure is applied to the space between the rovings and the mould surface.

In other words, at least one layer of fibre material is not laid in form of mats but in form of rovings, i.e. approximately one-dimensional fibre structures rather than two-dimensional fibre structures. Laying rovings of fibre material on the mould surface, or on a fibre material already laid on the mould surface, allows for a higher flexibility in setting the orientation of the load bearing filaments in the fibre reinforced structure. In addition wrinkles may more easily prevented by using rovings than by using mats. All the fibre material may be laid on the mould surface only in the form of rovings. However, fibre material such as mats or the like may be laid in addition to the rovings.

The rovings will be sucked towards the mould surface and, thereby, held in place by the applied low pressure. In this context it is advantageous if an air tight cover is placed above the rovings which are being laid on a mould surface or on a fibre material that is already laid on the mould surface. The cover ensures that a movement of the rovings is not only restricted by pressing the rovings to the underlying surface but also by pressing the air tight cover on the rovings when the low pressure is applied. In addition, the rovings may also be compressed by the pressure exerted by the cover when the low pressure is applied.

Dry rovings and/or wet rovings may be used as the laid rovings. Wet rovings means that the rovings are pre-impregnated with wet (and not hardened) resin before they are laid in the mould while dry rovings are not pre-impregnated when being laid in the mould.

The rovings may be provided on a reel and rolled off the reel for being laid on the mould surface or on a fibre material already laid on the mould surface. The rovings may be provided in a cassette and laid out of the cassette when being laid on the mould surface or on a fibre material already laid on the mould surface. The reel or the cassette may be moved over the mould surface while the rovings are rolled off the reel or laid out of the cassette.

The reel or a cassette may be held by a support means, e.g. a stand with rollers or wheels, where the support means rolls over the mould surface when the rovings are being laid on the mould surface or on a fibre material already laid on the mould surface.

As an alternative to a reel or cassette which is held by a support means with rollers or wheels the reel or cassette may be held by an arm of a support means, like e.g. a stand, where the support means is moved along the mould with the mould surface when the rovings are being laid on the mould surface or on a fibre material already laid on the mould surface. The movement of the support means may be provided by use of a crane, e.g. an overhead crane moving along a crane gantry, or by use of a carriage moving along the mould.

The reel or cassette may be located beneath the air tight cover when the rovings are being laid on the mould surface or on a fibre material already laid on the mould surface. Using a support means with rollers or wheels rolling over the mould surface when laying the rovings would allow the whole support means to be covered by the air tight cover.

The rovings may be provided on the reel or in the cassette in a length that is adapted to the dimension of the mould surface so that no cutting is necessary.

Laying the rovings may be optimized in terms of load bearing capacity of the finished fibre reinforced structure if a defined individual tension is applied to each roving laid on the mould surface or on a fibre material already laid on the mould surface.

To speed up laying the rovings on the mould surface or on a fibre material already laid on the mould surface a plurality of parallel rovings may be laid simultaneously on the mould surface or on a fibre material already laid on mould surface.

If multiple layers of rovings are laid in the mould the load bearing capacity of the finished structure may be optimized by the choice of the direction in which in the rovings extend in each layer. Moreover, rovings of different qualities and/or of different materials may be used throughout a layer or in different layers of rovings.

In order to provide an evenly distributed low pressure between the mould surface and the rovings laid on the mould, or a cover if present, channels may be provided in the mould surface. These channels are open towards the rovings laid on the mould surface or towards the fibre material already laid on the mould surface.

BRIEF DESCRIPTION OF THE DRAWINGS

Further features, properties and advantages of the present invention will become clear from the following description of embodiments in conjunction with the accompanying drawings.

FIG. 1 schematically shows a first embodiment of the inventive method of producing a fibre reinforced structure.

FIG. 2 shows a detail of FIG. 1.

FIG. 3 schematically shows a modification of the method shown in FIG. 1.

DETAILED DESCRIPTION OF INVENTION

Figure 4:
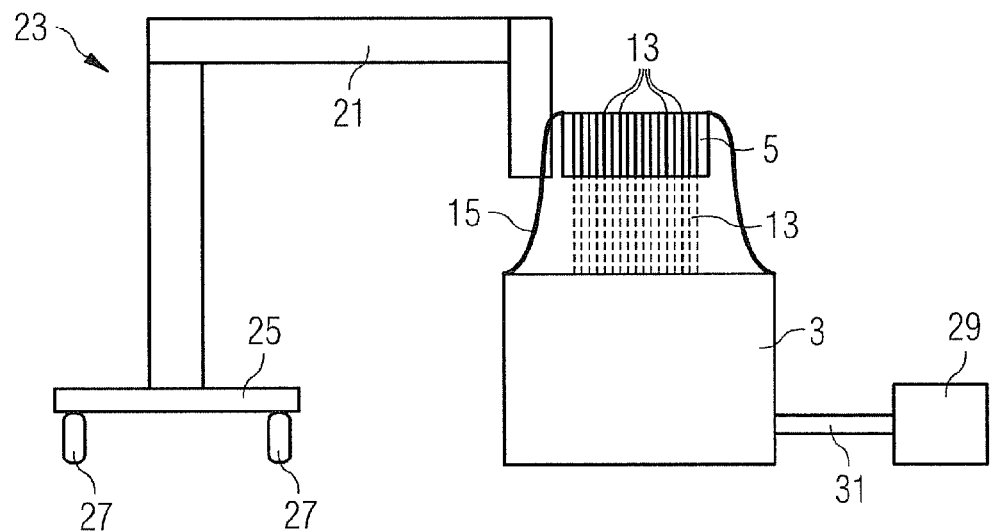
FIG. 4 shows the method shown in FIG. 3 in an alternative view.

A first embodiment of the method of producing a fibre reinforced structure is described with respect to FIGS. 1 and 2. FIG. 1 schematically shows the procedure of laying a fibre material, e.g. a glass fibre material, a carbon fibre material, etc., on mould surface and FIG. 2 shows how the fibre material is held in the mould before introducing a resin.

As a means for assisting in laying fibre material on a surface 1 of a mould 3 a reel 5 is used that is held by a support 7 with a base 9 comprising wheels or rollers 11. The fibre material to be laid on the mould surface is wound on the reel in form of rovings 13.

The mould may be a mould for any fibre reinforced structure, typically for a large fibre reinforced structure. In particular, the mould may be a mould for a wind turbine rotor blade, i.e. a mould with a mould surface representing a negative form or image of a rotor blade half shell. The form is used for producing the fibre reinforced structure, e.g. for producing a wind turbine rotor blade half shell, by means of vacuum assisted resin transfer moulding (VARTM).

When producing the fibre reinforced structure, fibre material is laid on the surface 1 of the mould 3 in form of rovings 13 which are unreeled from the reel 5 while the reel 5 is moving over the mould surface 1. In the present embodiment, the rovings 13 are dry rovings. However, it is noted that the rovings may be wet rovings. During laying the rovings 13 on the mould surface 1 the rovings 13, the reel 5 and the mould surface 1 not yet covered by rovings 13 are covered by an air tight cover which is, in the present embodiment, an air tight film 15 such as, e.g., a transparent PVC-type film. Using a transparent film provides visual verification that the rovings are correctly laid on the mould surface 1 under the film 15. To hold the rovings 13 in place on the mould surface 1 air is sucked out of the space between the mould surface 1 and the air tight film 15. By this measure, the dry rovings are sucked towards the mould surface 1. In addition, the film 15 is sucked towards the mould surface 1, hence securing the rovings. It is not necessary that the air tight film 15 be fixed air tight to the periphery of the mould if the capacity of the pump pumping the air out of the space between the mould surface 1 and the air tight film 15 is high enough to suck more air than the amount of air entering this space at the edge of the air tight film.

FIG. 2 shows the mould 3 with rovings 13 secured to the mould surface 1 by an low pressure between the mould surface 1 and the air tight film 15. The sucking that drags the film 15 towards the mould surface 1, thereby holding the rovings 13 in place and compressing the rovings, is indicated by arrow 19.

At this stage of the method the only meaning of the air tight film 15 is to secure the dry rovings in the mould and to compress the rovings in the mould. However, in a later stage of the inventive method the air tight film could form a vacuum bag when the resin is infused into the fibre material of the rovings which have been dry, i.e. not wetted by resin, up to this point. In this case, the film is secured air tight at the edge of the mould 3 after the reel 5 has been removed from the mould surface.

To improve sucking air out of the space between the mould surface 1 and the air tight film 15 air flow channels may be provided in the mould surface 1 as it is shown in FIG. 2. These air channels 17 may be useful for assuring an equally distributed sucking action throughout the mould 3.

After a first layer of rovings 13 has been laid on the mould surface the procedure of laying rovings may be repeated in order to provide a further layer of rovings. In particular, it is possible to provide two or more layers of different rovings, e.g. rovings of different quality or of different material. A different quality may for example be measured in terms of the weight of the rovings. For example rovings with a weight of 9.6 kg to 10.6 kg per meter, i.e. 96 to 106 tex may be used. Different weights of the rovings may be achieved by using rovings having the same diameters but different densities, by rovings having the same densities but different diameters, or by rovings having different densities and different diameters.

Moreover, the directions in which the rovings are laid on the mould surface 1 or on a layer of rovings already present in the mould may vary from layer to layer, as may the material used for the rovings. Moreover, rovings of different material or different quality may also be present throughout a layer. For example, it would be possible to have every n-th roving in form of a carbon fibre roving whereas the rest of the rovings are glass fibre rovings.

By using the reel 5 it is possible that a number of rovings may be laid in parallel on the mould surface 1, or on a layer of rovings already present in the mould. In particular the rovings may be laid as a plurality of parallel rovings in the range of 10 to 100 parallel rovings, preferably in the range to 20 to 50 rovings such as, of example, 32 rovings.

A modification of the method shown in FIG. 1 is schematically shown in FIGS. 3 and 4. Elements which do not differ from those shown in FIGS. 1 and 2 are denominated with the same reference numerals and will not to be explained again.

The modified method shown in FIGS. 3 and 4 differs from the method shown in FIGS. 1 and 2 in that the reel 5 is suspended from an arm 21 of a support stand 23. The support stand 23 rests on a movable base 25, e.g. a carriage comprising rollers, wheels 27 or other means that allow to move the carriage. When laying the rovings on the mould surface 1 or on a fibre material already laid on the mould surface 1 is moved along the mould 3 thereby moving the reel 5 over the mould surface 1.

As can be seen from FIG. 4 a number of parallel rovings 13 may be unreeled to be laid on the mould surface while the reel 5 is moved along the mould 1 by means of the support stand 23. At the same time, the reel 5 and a large part of the mould surface are covered by the air tight film 15. Also shown in FIG. 4 is the pump 29 used for sucking the air out of the space between the air tight film 15 and the mould surface through a suction line 31.

The reel 5 does not necessarily need to be suspended from an arm supported by a stand but may alternatively be suspended from an arm hanging from an overhead support structure like an overhanging frame or a gantry.

Figure 5:
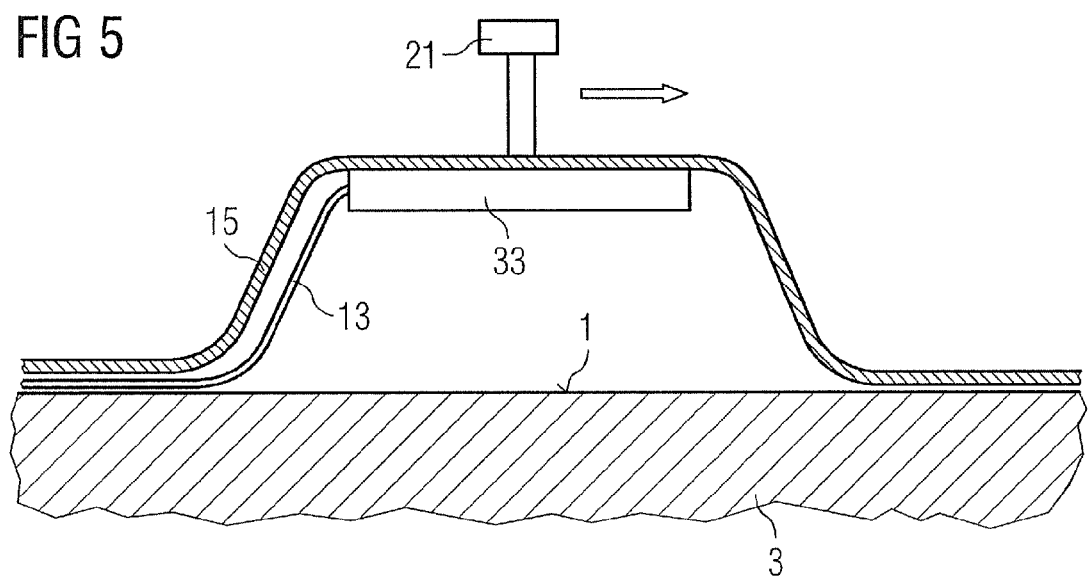
FIG. 5 schematically shows a second embodiment of the inventive method of producing a fibre reinforced structure.

A second embodiment of the inventive method is schematically shown in FIG. 5. Those elements that do not differ from the elements shown in FIGS. 1 and 2 are denominated with the same reference numerals as in FIGS. 1 and 2 and will not be explained again.

The second embodiment differs from the first embodiment in that the rovings 13 to be laid on the mould surface 1 or on a fibre layer already laid on the mould surface 1 are not rolled off a reel 5 but are located in a cassette 33 which is, in the present embodiment, suspended from an arm 21 of a support stand that may move along the mould 3. Instead of being suspended from an arm 21 the cassette 33 may also be supported by a support as it has been described with respect to FIG. 1.

The rovings 13 in the cassette 33 may be prepared in an apportioned length to each layer. This would ensure that no cutting of the material is needed in the lay-out process. Furthermore, it can be ensured that only the exact weight of rovings that is needed is carried by the cassette 32. A further advantage of applying rovings 13 in a predefined length is that the effects of "ply-drop" may be minimized. Ply-drop is an effect that occurs when, at positions where one or more layers of fibre are ended, discontinuities occur which may induce severe force concentrations at this point.

The rovings 13 laid out from the cassette 33 may have different length since the lengths of different parts of the fibre reinforced structure to be produced may be different.

For FIGS. 1 to 5 a vacuum assisted resin transfer moulding is performed after the fibre material has been laid in the mould in order to finish the production of the fibre reinforced structure. If the fibre reinforced structure is a half shell of a wind turbine rotor blade two half shells will be joined together to ultimately form a wind turbine rotor blade. In the vacuum assisted resin transfer moulding process the air tight film 15 may be used to become part of the vacuum barrier that allows to create a vacuum (low pressure) in the space comprising the rovings laid in the mould, which vacuum sucks resin into the fibre material.

Although the inventive method of producing a fibre reinforced laminated structure has been described with respect to exemplary embodiments of the invention modifications of these embodiments are conceivable. For example, it is possible to control the tension of each individual roving that is laid out in the mould. By this measure the lay-out of the rovings may be optimized. A means for controlling the tension may be provided at the reel or the cassette.

A further modification of the embodiments described with respect to FIGS. 1 to 5 may be that mats of fibre material are laid in the mould, in addition to the rovings. Combining mats and rovings may be used in order to optimize properties of the fibre reinforced structure to be produced.

The present invention that has been described with respect to the embodiments is advantageous in that laying rovings in an evacuated space between an air tight film and a mould surface establishes a strong hold of the rovings so that they do not disalign or move after they have been laid in the mould. This in turn ensures that no wrinkles occur in the finished fibre reinforced structure. In particular, the inventive method is advantageous when more than one layer of rovings are to established as the layers will be kept in position in relation to each other by kind of pressing the rovings towards each other so that they cannot disalign.

In one embodiment the rovings laid in the mould are kept in position by a vacuum (low pressure) in addition to being compressed, which increases the fibre density.

Substantially the whole process described may be initiated and performed automatically by robots, etc., which is both time efficient and cost efficient.

The invention claimed is:

1. A method of laying a fibre material on a mould surface resembling a negative image of a fibre reinforced structure to be produced for a wind turbine blade, the laying comprising:
    prior to infusing a resin and curing;
    placing an air tight cover over a mould surface;
    applying a low pressure to a space between the air tight cover and the mould surface, and
    providing the one-dimensional fibre structures on a reel, wherein the laying of the approximately one-dimensional fibre structures comprises rolling the reel in the low pressure space for laying the approximately one-dimensional fibre structures on the mould surface or on the fibre material already laid on the mould surface, or
    providing the one-dimensional fibre structures in a cassette, wherein the laying of the approximately one-dimensional fibre structures comprises moving the cassette in the low pressure space for laying the approximately one-dimensional fibre structures on the mould surface or on the fibre material already laid on the mould surface; and
    laying approximately one-dimensional fibre structures on the mould surface or on a fibre material already laid on the mould surface.

2. The method as claimed in claim 1, wherein the approximately one-dimensional fibre structures are dry.

3. The method as claimed in claim 1, wherein the reel or cassette is moved over the mould surface while the approximately one-dimensional fibre structures are rolled off the reel or laid out of the cassette.

4. The method as claimed in claim 1, wherein the reel or cassette is held by a support means with rollers or wheels, and where the support means rolls over the mould surface when the approximately one-dimensional fibre structures are being laid on the mould surface or on a fibre material already laid on the mould surface.

5. The method as claimed in claim 1, wherein the reel or cassette is held by an arm of a support means, wherein the support means is moved along the mould with the mould surface when the approximately one-dimensional fibre structures are being laid on the mould surface or on a fibre material already laid on the mould surface.

6. The method as claimed in claim 1, wherein the reel or cassette is located beneath the air tight cover when the approximately one-dimensional fibre structures are being laid on the mould surface or on a fibre material already laid on the mould surface.

7. The method as claimed in claim 1, wherein the approximately one-dimensional fibre structures are provided in a length equal to the dimension mould surface.

8. The method as claimed in claim 1, wherein a defined individual tension is applied to each roving laid on the mould surface or on a fibre material already laid on the mould surface.

9. The method as claimed in claim 1, wherein a plurality of parallel approximately one-dimensional fibre structures are simultaneously laid on the mould surface or on a fibre material already laid on the mould surface.

10. The method as claimed in claim 9, wherein for at least a portion of the parallel approximately one-dimensional fibre structures different qualities and/or different materials are used.

11. The method as claimed in claim 1, wherein multiple layers of approximately one-dimensional fibre structures are laid.

12. The method as claimed in claim 11, wherein for at least a portion of the multiple layers of approximately one-dimensional fibre structures different qualities and/or different materials are used.

13. The method as claimed in claim 11, wherein approximately one-dimensional fibre structures of different qualities and/or different materials are used.

14. The method as claimed in claim 1, wherein the mould includes channels in the mould surface, and wherein the channels are open towards the approximately one-dimensional fibre structures to be laid on the mould surface or towards the fibre material already laid on the mould surface.

15. A method of producing a fibre reinforced structure, comprising: laying a fibre material according to claim 1; and, subsequent to restricting the movement of the approximately one-dimensional fibre structures, infusing the resin in the fibre structures having been laid; and curing the infused fibre structures.

16. A method of laying a fibre material on a mould surface resembling a negative image of a fibre reinforced structure for a wind turbine blade, the laying comprising:
  prior to infusing a resin and curing;
  placing a cover over a mould surface;
  applying a pressure to a space between the cover and the mould surface, and
  providing the one-dimensional fibre structures on a reel, wherein the laying of the approximately one-dimensional fibre structures comprises rolling the reel in the pressurized space for laying the approximately one-dimensional fibre structures on the mould surface or on the fibre material already laid on the mould surface, or
  providing the one-dimensional fibre structures in a cassette, wherein the laying of the approximately one-dimensional fibre structures comprises moving the cassette in the pressurized space for laying the approximately one-dimensional fibre structures on the mould surface or on the fibre material already laid on the mould surface; and
  laying approximately one-dimensional fibre structures on the mould surface or on a fibre material already laid on the mould surface.

17. The method of claim 16, wherein the cover comprises an air tight cover and the pressure is an underpressure applied in response to a vacuum formed in the space.

18. The method of claim 16, wherein the pressure comprises compression applied by the cover.

* * * * *